(12) United States Patent
Wilkins et al.

(10) Patent No.: US 12,505,149 B2
(45) Date of Patent: Dec. 23, 2025

(54) MULTI-MODAL SOUND EFFECTS RECOMMENDATION

(71) Applicant: ADOBE INC., San Jose, CA (US)

(72) Inventors: Julia Lepley Wilkins, Brooklyn, NY (US); Oriol Nieto-Caballero, Oakland, CA (US); Justin Salamon, San Francisco, CA (US)

(73) Assignee: ADOBE INC., San Jose, CA (US)

( * ) Notice: Subject to any disclaimer, the term of this patent is extended or adjusted under 35 U.S.C. 154(b) by 393 days.

(21) Appl. No.: 18/089,710

(22) Filed: Dec. 28, 2022

(65) Prior Publication Data
US 2024/0220530 A1    Jul. 4, 2024

(51) Int. Cl.
*G06F 16/432*    (2019.01)
*G06V 20/40*    (2022.01)
*G10L 15/26*    (2006.01)

(52) U.S. Cl.
CPC .......... *G06F 16/433* (2019.01); *G06F 16/434* (2019.01); *G06V 20/46* (2022.01); *G10L 15/26* (2013.01)

(58) Field of Classification Search
None
See application file for complete search history.

(56) References Cited

U.S. PATENT DOCUMENTS

| | | | |
|---|---|---|---|
| 5,228,113 A * | 7/1993 | Shelton | G06N 3/084 706/25 |
| 2011/0191374 A1* | 8/2011 | Bengio | G06F 16/53 707/E17.014 |
| 2013/0251340 A1* | 9/2013 | Jiang | G06V 20/46 386/E5.003 |
| 2017/0091619 A1* | 3/2017 | Towal | G06V 10/82 |
| 2020/0202168 A1* | 6/2020 | Mao | G06V 10/809 |
| 2021/0004402 A1* | 1/2021 | Li | G06N 3/08 |
| 2021/0035610 A1* | 2/2021 | Krishnamurthy | G11B 27/11 |
| 2021/0321172 A1* | 10/2021 | Krishnamurthy | G06N 3/04 |
| 2023/0154161 A1* | 5/2023 | Pham | G06N 3/0442 382/156 |
| 2023/0306087 A1* | 9/2023 | Krishnan | G06N 20/00 |

OTHER PUBLICATIONS

Oriol et al. "Transcription-Enriched Joint Embeddings for Spoken Descriptions of Images and Videos". arXiv:2006.00785v1. Published Jun. 1, 2020. URL Link: <https://arxiv.org/pdf/2006.00785>. Accessed Sep. 2025. (Year: 2020).*

* cited by examiner

Primary Examiner — Irene Baker
(74) Attorney, Agent, or Firm — Shook Hardy & Bacon L.L.P.

(57) ABSTRACT

A sound effects system recommends sound effects using a multi-modal embedding space for projecting visuals, text, and audio. Given an input query comprising a visual (i.e., an image/video) and/or text, an encoder generates a query embedding in the multi-modal embedding space in which sound effects have been projected into sound effect embeddings. A relevant sound effect embedding in the multi-modal space is identified using the query embedding, and a recommendation is provided for a sound effect corresponding to the sound effect embedding.

19 Claims, 8 Drawing Sheets

MULTI-MODAL SOUND EFFECTS RECOMMENDATION

BACKGROUND

Finding the perfect sound effects to match different scenes in a video is a hard and time consuming task, and video creators of all skill levels face this challenge day-to-day. Even for experts, the process of finding sound effects to match different moments in videos currently relies heavily on the text metadata or filenames associated with a sound effects library. This can be limiting for multiple reasons. For instance, the text metadata is sometimes incorrect, incomplete, or missing entirely. Additionally, describing sounds with words is not always intuitive. Further, in some instances, sounds come from an unexpected source, such as, for example, using the sound of shoes on glass shards to represent the sound of a person walking through the snow (i.e., a custom-made sound effect, often referred to as a "foley").

SUMMARY

Some aspects of the present technology relate to, among other things, a sound effects system that employs a multi-modal embedding space for recommending sound effects in response to visual-based and/or text-based queries. In accordance with some aspects, an audio encoder is trained to project audio into a shared visual and text embedding space provided by a visual encoder and a text encoder. Once trained, the audio encoder is used to project sound effects into the multi-modal embedding space to generate sound effect embeddings that are used for retrieval purposes. In particular, given a query input comprising a visual and/or text, a query embedding is generated. For instance, the visual encoder is used to generate a visual embedding in the case of a visual query, and the text encoder is used to generated a text embedding in the case of a text query. One or more sound effect embeddings that are similar to the query embedding are identified (e.g., based on a similarity or distance in the multi-modal embedding space). The sound effect associated with each identified sound effect embedding is provided as a recommendation in response to the query input.

In accordance with some aspects, a pipeline is used to generate high-quality pairs of visual and audio files for training the audio encoder. Given a set of visuals (which can be curated to identify visuals that are object-centered and/or likely to correspond to sound effects) and a set of audio files, a visual embedding is generated for each visual, and a text embedding is generated from text metadata for each audio file. Similar visual embeddings and text embeddings are identified, and the corresponding visuals and audio files are matched to generate audio-visual pairs, which are then used to train the audio encoder using a contrastive loss.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein.

DETAILED DESCRIPTION

Overview

Traditional solutions for adding sound effects to videos often employ text-based searching. These solutions rely on text-based metadata, where a user enters textual queries to search for sounds in a sound effects library that has been annotated with textual metadata, such as tags or short descriptions. These solutions suffer from a number of limitations, such as, for instance: the text metadata can be incorrect, the difficulty in accurately describing sounds with text; and relevant sounds can be missed if the text metadata is not a direct match to the user's query (which occurs, for instance, in some cases of "foley" sound effects).

Some alternative solutions have been proposed that attempt to match sound effects to an input visual query, such as a video. These solutions either rely on the text metadata of the sound effects to retrieve relevant sounds given a video scene or require training a model from scratch using noisy audio-visual datasets. For instance, one solution uses image embeddings of video frames and text embeddings of metadata from sound effects (e.g. tags, filenames, or descriptions), to retrieve relevant sound effects given a sequence of video frames. This method relies heavily on the quality of text metadata associated with each sound effect. As with conventional text-based searches for sound effects, this can lead to many missed opportunities for finding sound effects that contain particularly relevant audio, but lack detail in the associated text metadata. Another solution targets audio-visual correspondence but employs a dataset that is far too noisy to yield high audio retrieval accuracy from image input on the downstream task of sound effects recommendation for video. Additionally, the embedding space is limited to only the image and audio modalities.

Tangentially related work for sound effects recommendation for videos is focused on sound effect generation, in which sounds are completely synthesized given visual input. However, sound effects generation does not produce audio of production-grade quality, and is thus not yet usable in most creative applications. Additionally, automatic sound effects generation takes the creative agency away from the user. In particular, since the final sound effects is directly generated, the user has no ability to incorporate creative input in choosing which sound effects to use.

Aspects of the technology described herein improve the functioning of the computer itself in light of these shortcomings in existing technologies by providing sound effects recommendations using a combined visual, text, and audio embedding space to retrieve existing sound effects in response to visual queries and/or text queries.

In accordance with some aspects, an audio encoder is trained to project audio into a joint visual and text embedding space provided by a visual encoder and a text encoder, respectively. Once trained, the audio encoder provides sound effect embeddings from this joint embedding space that are used for sound effect retrieval. Given an input (comprising a visual and/or a text query), the visual encoder and/or text encoder generates an input embedding. For instance, in instances in which the input comprises a visual (i.e., an image or a video), the visual encoder generates a visual embedding from the visual. In instances in which the input comprises text, the text encoder generates a text embedding from the text. The input embedding is used to identify one or more similar sound effect embeddings in the multi-modal embedding space. For instance, in some configurations, a similarity score (e.g., a cosine similarity) is computed between the input embedding and each of a number of sound effect embeddings. One or more sound effect embeddings that are the most similar to the input embedding are identified, and the sound effect associated with each sound effect embedding is provided as a sound effect recommendation.

The audio encoder is trained to project audio into the visual-text embedding space provided by the visual encoder and the text encoder using audio-visual pairs. Each audio-visual pair comprises a visual (i.e., an image or a video) paired with an audio that corresponds with the visual (e.g., a video of a dog barking paired with barking audio). Given an audio-visual pair, the visual encoder generates a visual embedding from the visual and the audio encoder generates an audio embedding from the audio. A contrastive loss is computed based on the visual embedding and the audio embedding, and parameters (e.g., weights) of the audio encoder are updated (e.g., via backpropagation) based on the contrastive loss. In this way, the audio encoder learns to generate audio embeddings that are similar to visual embeddings for corresponding visuals.

Some aspects employ a self-supervised data pipeline for generating high-quality audio-visual pairs for training the audio encoder. The pipeline operates on a set of visuals and a set of audio files with text metadata. In some configurations, the set of visuals is curated to include object-centered visuals (i.e., objects that typically generate sound and therefore benefit from sound effects) and/or to include visuals that better match sound effects. A visual embedding is generated for each visual using a visual encoder, and a text embedding is generated from the text metadata for each audio using a text encoder. Pairs of similar visual embeddings and text embeddings are identified (e.g., based on cosine similarity), and an audio-visual pair is provided by matching the visual and audio file corresponding with each identified pair of embeddings. This pipeline can be employed for generating high-quality audio-visual pairs, for instance, as an existing high quality dataset of sound effect moments may not be available and generic audio-visual datasets can be too noisy and not necessarily object-focused with scenes of high audio-visual correspondences. Because of this, this pipeline provides a way to leverage text and image relationships to generate high quality audio-visual pairs that can be used to train the audio encoder for sound effects.

Aspects of the technology described herein provide a number of improvements over existing technologies. For instance, the machine learning system for automatic sound effect recommendation departs from previous text-based retrieval methods. Instead of relying on text metadata for sound effect retrieval, the technology described herein is able to directly match an input query to the audio of sound effects in a sound effects library. In this way, sound effect recommendation provided by the technology described herein is not hindered by the limitations of text-based retrieval relying on text metadata. Additionally, the shared visual-text-audio embedding space allows for visual and/or text querying. Sound effect retrieval can be performed given a visual query (i.e., video/image) or a natural language text query, or a combination of both (visual+text), retaining powerful potential for cross-modal retrieval across the visual, text, and audio modalities. Some aspects of the technology described herein also provide high-quality pairs for training the audio encoder. Some existing solutions are hindered by the lack of high-quality data for training. The audio-visual pair generation pipeline in accordance with some aspects herein does not require any manual labeling and is able to provide state-of-the-art results. Further, instead of generating sound effects, the technology described herein provides a retrieval-based paradigm that allows multiple sound effects to be returned (e.g., as a ranked list), leaving the creative decision in the user's hands.

Example System for Sound Effects Recommendation

Figure 1:
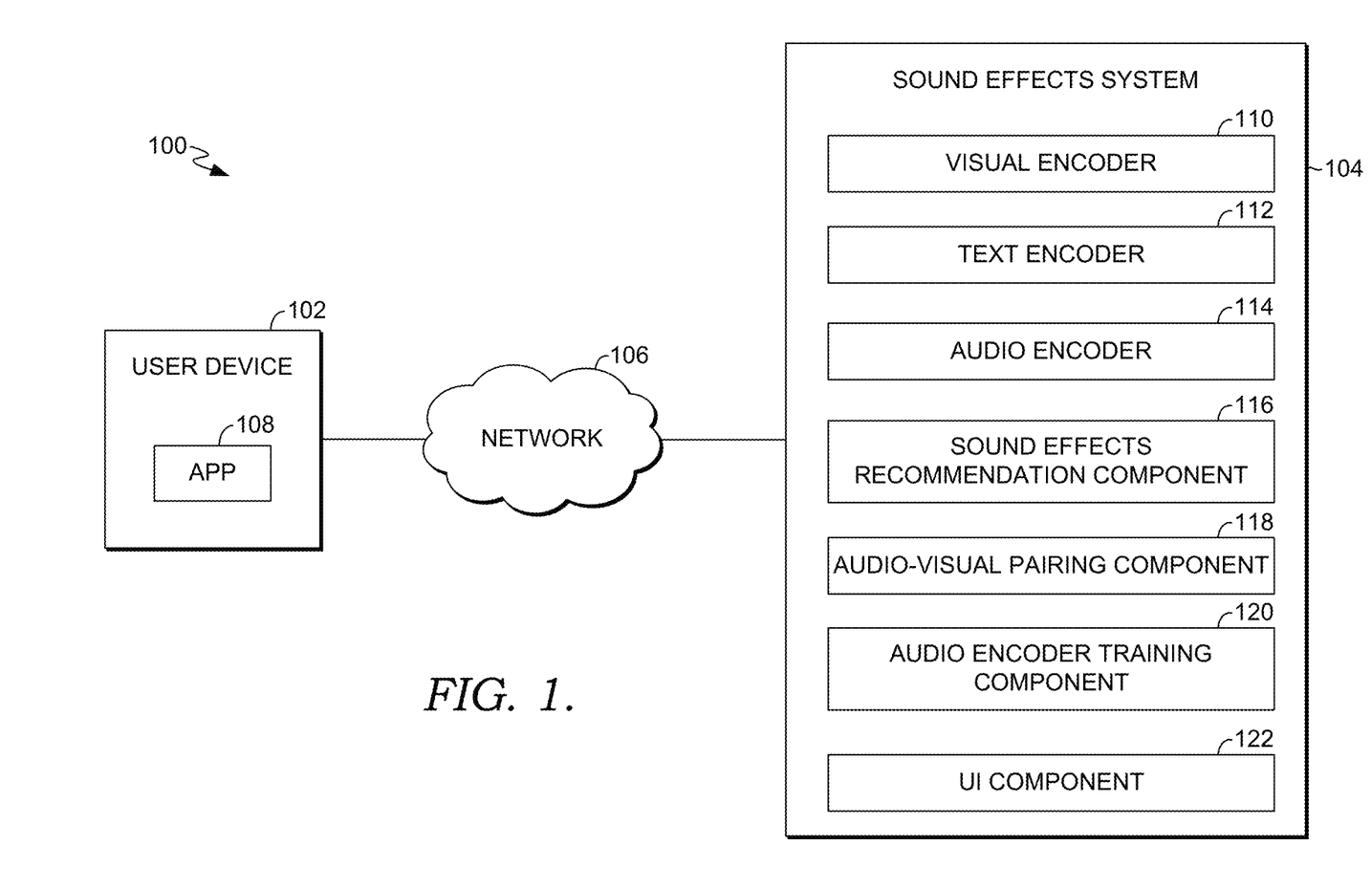
FIG. 1 is a block diagram illustrating an exemplary system in accordance with some implementations of the present disclosure.

With reference now to the drawings, FIG. 1 is a block diagram illustrating an exemplary system 100 for recommending sound effects given a query input comprising a video, image, and/or text in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, various functions can be carried out by a processor executing instructions stored in memory.

The system 100 is an example of a suitable architecture for implementing certain aspects of the present disclosure. Among other components not shown, the system 100 includes a user device 102 and a sound effects system 104. Each of the user device 102 and sound effects system 104 shown in FIG. 1 can comprise one or more computer devices, such as the computing device 800 of FIG. 8, discussed below. As shown in FIG. 1, the user device 102 and the sound effects system 104 can communicate via a network 106, which can include, without limitation, one or more local area networks (LANs) and/or wide area networks (WANs). Such networking environments are commonplace in offices, enterprise-wide computer networks, intranets, and the Internet. It should be understood that any number of user devices and server devices can be employed within the system 100 within the scope of the present technology. Each can comprise a single device or multiple devices cooperating in a distributed environment. For instance, the sound effects system 104 could be provided by multiple server devices collectively providing the functionality of the sound effects system 104 as described herein. Additionally, other components not shown can also be included within the network environment.

The user device 102 can be a client device on the client-side of operating environment 100, while the sound effects system 104 can be on the server-side of operating environment 100. The sound effects system 104 can comprise server-side software designed to work in conjunction with client-side software on the user device 102 so as to implement any combination of the features and functionalities discussed in the present disclosure. For instance, the user device 102 can include an application 108 for interacting with the sound effects system 104. The application 108 can be, for instance, a web browser or a dedicated application for providing functions, such as those described herein. This division of operating environment 100 is provided to illustrate one example of a suitable environment, and there is no requirement for each implementation that any combination of the user device 102 and the sound effects system 104 remain as separate entities. While the operating environment 100 illustrates a configuration in a networked environment with a separate user device 104 and sound effects system 104, it should be understood that other configurations can be employed in which components are combined. For instance, in some configurations, the user device 102 can also provide some or all of the capabilities of the sound effects system 104 described herein.

The user device 102 comprises any type of computing device capable of use by a user. For example, in one aspect, the user device comprises the type of computing device 800 described in relation to FIG. 8 herein. By way of example and not limitation, the user device 102 can be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device where notifications can be presented. A user can be associated with the user device 102 and can interact with the sound effects system 104 via the user device 102.

At a high level, the sound effects system 104 recommends sound effects given a query input comprising a video, image, and/or text. As shown in FIG. 1, the sound effects system 104 includes a visual encoder 110, a text encoder 112, an audio encoder 114, a sound effects recommendation component 116, an audio-visual pairing component 118, an audio encoder training component 120, and a user interface component 122. The components of the sound effects system 104 can be in addition to other components that provide further additional functions beyond the features described herein. The sound effects system 104 can be implemented using one or more server devices, one or more platforms with corresponding application programming interfaces, cloud infrastructure, and the like. While the sound effects system 104 is shown separate from the user device 102 in the configuration of FIG. 1, it should be understood that in other configurations, some or all of the functions of the sound effects system 104 can be provided on the user device 102.

In one aspect, the functions performed by components of the sound effects system 104 are associated with one or more applications, services, or routines. In particular, such applications, services, or routines can operate on one or more user devices, servers, can be distributed across one or more user devices and servers, or be implemented in the cloud. Moreover, in some aspects, these components of the sound effects system 104 can be distributed across a network, including one or more servers and client devices, in the cloud, and/or can reside on a user device. Moreover, these components, functions performed by these components, or services carried out by these components can be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 100, it is contemplated that in some aspects, functionality of these components can be shared or distributed across other components.

The sound effects system 104 includes a number of encoders 110, 112, 114 for projecting visuals (i.e., images and/or videos), text, and audio into a shared multi-modal embedding space such that similar images/videos, text, and audio are close together in the multi-modal embedding space. Each of the encoders 110, 112, and 114 can comprise an encoding and projection model that, given an input, generates an embedding of that input in the shared multi-modal embedding space. In particular, the visual encoder 110 takes an image or video as input and generates a visual embedding of the image or video in the multi-modal embedding space. The text encoder 112 takes text as input and generates a text embedding of the text in the multi-modal embedding space. The audio encoder 114 takes audio as input and generates an audio embedding of the audio in the multi-modal embedding space. In various configurations, each of the encoders 110, 112, 114 can employ separate encoding and projection architectures or can combine encoding and projection in a single architecture.

In accordance with various aspects of the technology described herein, the audio encoder 114 is trained to project audio into a shared visual-text embedding space (i.e., a shared image-text embedding space or a shared video-text embedding space) provided by the visual encoder 110 and the text encoder 112. More particularly, the visual encoder 110 and the text encoder 112 are pre-trained to respectively generate visual embeddings and text embeddings. The audio encoder 114 is then trained to generate audio embeddings in the shared visual-text embedding space, thereby providing a multi-modal embedding space for images/videos, text, and audio (i.e., a shared visual-text-audio embedding space).

Some configurations initially train the visual encoder 110 and the text encoder 112 to provide a shared visual-text embedding space. Other configurations employ an existing pre-trained model. For example, an existing shared image-text embedding space, such as that provided by the Contrastive Language Pre-Training (CLIP) model could be employed. The CLIP model includes an image encoder and text encoder pre-trained on a massive amount of image and text pairs from the Internet using a contrastive paradigm in which the model was trained to predict, given an image and a pool of text snippets, which text was originally paired with the image. The CLIP image encoder is similar to the original Vision Transformer (ViT), and the CLIP text encoder is also a transformer, based on the architecture used for GPT-2. In such configurations using the CLIP model, the visual encoder 110 comprises the CLIP image encoder (or is otherwise based on the CLIP image encoder), while the text encoder 112 comprises the CLIP text encoder (or is otherwise based on the CLIP text encoder).

Other configurations employ an existing shared video-text embedding space, such as that provided by the VideoCLIP model. The VideoCLIP model is similar to the CLIP model except that it includes a video encoder (instead of an image encoder) pre-trained with a text encoder to generate video and text embeddings in a shared video-text embedding space. In such configurations using the VideoCLIP model, the visual encoder 110 comprises the VideoCLIP video encoder (or is otherwise based on the VideoCLIP video encoder), while the text encoder 112 comprises the VideoCLIP text encoder (or is otherwise based on the VideoCLIP text encoder). It should be noted that the CLIP and VideoCLIP models are provided by way of example only, and other types of models providing shared visual-text embedding spaces can be employed within the scope of embodiments described herein.

The audio encoder 114 comprises an audio encoder and projection model trained to project audio into a shared visual-text embedding space provided by the visual encoder 110 and the text encoder 112. The audio encoder 114 can comprise separate encoder and projection architectures (e.g., a pre-trained CNN (convolutional neural network) audio encoder followed by an MLP (multilayer perceptron) or Transformer projection), or it can combine the encoding and projection into a single architecture. Notably, by projecting audio into a shared visual-text embedding space, embodiments are able to conveniently remain in a multi-modal embedding space containing all three modalities (image/video, text, and audio). In some configurations, the audio encoder 114 can be based on a pre-trained audio encoder, such as a pre-trained Wav2CLIP architecture as a joint encoder/projection architecture, which is further trained. It should be noted that that Wav2CLIP is just one possible choice of pre-trained audio encoder. Other possible encoders that could be employed include, for instance, PANNs (pre-trained audio neural networks) and Audio Spectrogram Transformer. In other configurations, as opposed to leveraging a pre-trained audio encoder, the audio encoder 114 is trained from scratch.

The sound effects recommendation component 116 employs the visual encoder 110, the text encoder 112, and the audio encoder 114 to recommend sound effects. Given a collection of sound effects, the sound effects recommendation component 116 employs the audio encoder 114 to generate an audio embedding in the multi-modal embedding space for each sound effect. In particular, each sound effect comprises an audio file that is provided as input to the audio encoder 114, which projects the audio signal of the sound effect into the multi-modal embedding space. This provides a collection of sound effect embeddings, each sound effect embedding corresponding to a given sound effect. Note that the collection of sound effects can comprise system-provided sound effects and/or user-provided sound effects. For instance, in some cases, a video-editing tool can include a collection of sounds effects, and an audio embedding is generated for each sound effect. In some cases, a user can upload sound effects, and an audio embedding is generated for each sound effect for each user-provided sound effect.

Given an input visual (image/video) and/or text, the sound effects recommendation component 116 uses the sound effect embeddings to identify one or more sound effects, which are returned as sound effects recommendations. In particular, the sound effects recommendation component 116 employs the visual encoder 110 and/or the text encoder 112 to generate an embedding of the input and identifies one or more sound effect embeddings based on a similarity between the input embedding and sound effect embeddings in the multi-model embedding space. The similarity can be based on, for instance, a cosine similarity, computed between the input embedding and sound effect embeddings. One or more sound effect embeddings having a highest similarity score (e.g., a highest cosine similarity) are identified, and the sound effect corresponding to each identified sound effect embedding is returned as part of the sound effects recommendation.

The input for identifying sound effects can comprise a video input, an image input, and/or a text input. In instances in which the input is a video and the visual encoder 110 comprises a video encoder, the video is provided as input to the visual encoder 110, which generates a visual embedding from the video. In instances in which the input is a video and the visual encoder comprises an image encoder, a frame is extracted from the video and provided as input to the visual encoder 110, which generates a visual embedding from the frame. For instance, a center frame from the video can be extracted and used to generate the visual embedding. In some instances, a visual embedding can be generated from multiple frames from a video. For instance, multiple frames could be extracted from a video, an embedding could be generated from each frame, and a visual embedding could be generated from the frame embeddings (e.g., as an average of the frame embeddings). In instances in which the input is an image, the image is provided to the visual encoder 110, which generates a visual embedding from the image. In instances in which the input is text, the text is provided to the text encoder, which generates a text embedding from the text.

In some configurations, the input comprises a combination of different modalities. For instance, the input can comprise a video and text. In such instances, the visual encoder 110 generates a visual embedding from the video, and the text encoder 112 generates a text embedding from the text input. The visual embedding and the text embedding are used to identify sound effect embeddings. In some instances, a single embedding is generated from the visual embedding and the text embedding (e.g., an average of the visual embedding and the text embedding), and similarities of sound effect embeddings to the single embedding are determined. In other instances, similarities of sound effect embeddings to each of the visual embedding and the text embedding are determined.

Figure 2:
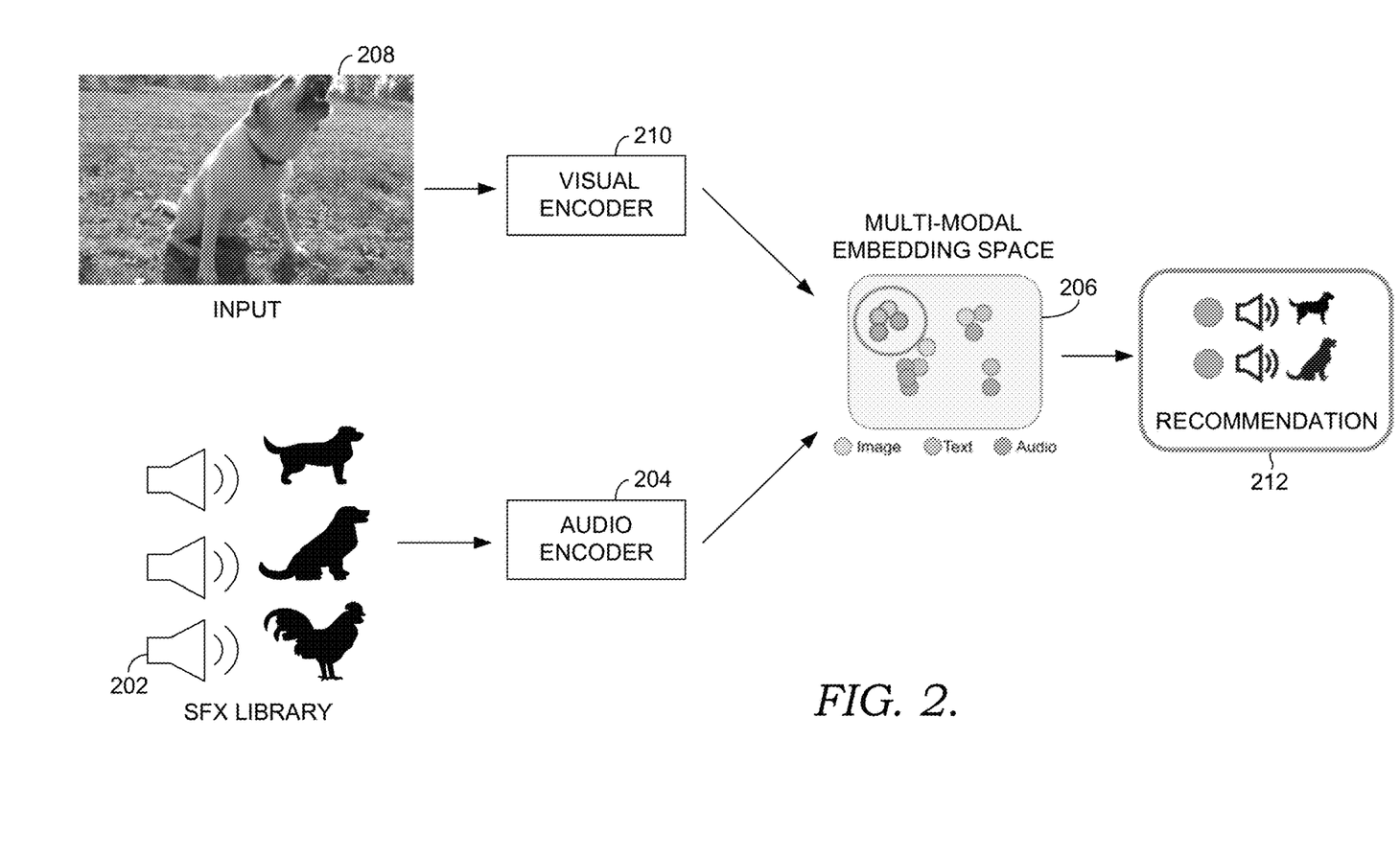
FIG. 2 is a block diagram illustrating an example of providing a sound effects recommendation in accordance with some implementations of the present disclosure.

FIG. 2 provides a block diagram showing an example of sound effects recommendation. As shown in FIG. 2, each sound effect from a collection of sound effects 202 is provided as input to an audio encoder 204 (e.g., the audio encoder 114 from FIG. 1). The audio encoder 204 generates a sound effect embedding in a multi-modal embedding space 206 for each sound effect. As also shown in FIG. 2, an input 208 is received for identifying one or more sound effects. In this example, the input 208 comprises a video. A frame (e.g., center frame) is extracted from the video, and the frame is provided as input to a visual encoder 210, which generates a visual embedding in the multi-modal embedding space. Similarity scores are determined for sound effect embeddings based on the visual embedding. For instance, a cosine similarity can be determined between the visual embedding and a sound effect embedding. Based on the similarity scores, one or more sound effect embeddings are identified, and the sound effect corresponding with each identified sound effect embedding is returned as part of a sound effects recommendation 212.

Although the multi-modal embedding space 206 in the example of FIG. 2 comprises a shared image-text-audio embedding space, in other configurations, a shared video-text-audio embedding space can be employed. Additionally, while the input 208 comprises a video in the example of FIG. 2, in other configurations, the input can comprise an image, text, or any combination of video, image, and text.

With reference again to FIG. 1, the sound effects system 104 also includes an audio-visual pairing component 118 and an audio encoder training component 120 for training the audio encoder 116 to project sound effects into a shared visual-text embedding space to provide a multi-modal embedding space for videos/images, text, and audio. The audio-visual pairing component 118 identifies audio-visual pairs, in which each audio-visual pair identifies an audio file paired with an image and/or a video. In some configurations, the audio-visual pairing component 118 employs an existing set of audio-visual pairs. In other configurations, the audio-visual pairing component processes an input set of audio files and an input set of images or videos to identify audio-visual pairs. In some configurations, the input set of audio files comprises a collection of sound effects.

In some aspects of the technology described herein, the audio-visual pairing component 118 identifies audio-visual pairs by leveraging text metadata associated with each audio file. Given a set of images and/or videos, the audio-visual pairing component 118 employs a visual encoder (which could be the visual encoder 110 or another visual encoder) to generate a visual embedding for each image/video. Given a set of audio files where each audio file has text metadata describing the audio, the audio-visual pairing component 118 employs a text encoder (which could be the text encoder 112 or another text encoder) to generate a text embedding for each audio file from the text metadata corresponding to each audio file. The audio-visual pairing component 118 determines similarity scores (e.g., cosine similarity) between pairs of visual embeddings and text embeddings and identifies audio-visual pairs based on the similarity scores. For instance, an audio file and an image/video could be paired based on the text embedding generated from the text metadata for the audio file and the visual embedding generated from the image/video having a similarity score satisfying a threshold. In some cases, multiple images/videos could be paired with a given audio file, and/or multiple audio files could be paired with a given image/video. For instance, the top-n images/videos could be paired with a given audio file based on the similarity scores between the embeddings for the images/videos and the audio file.

Figure 3:
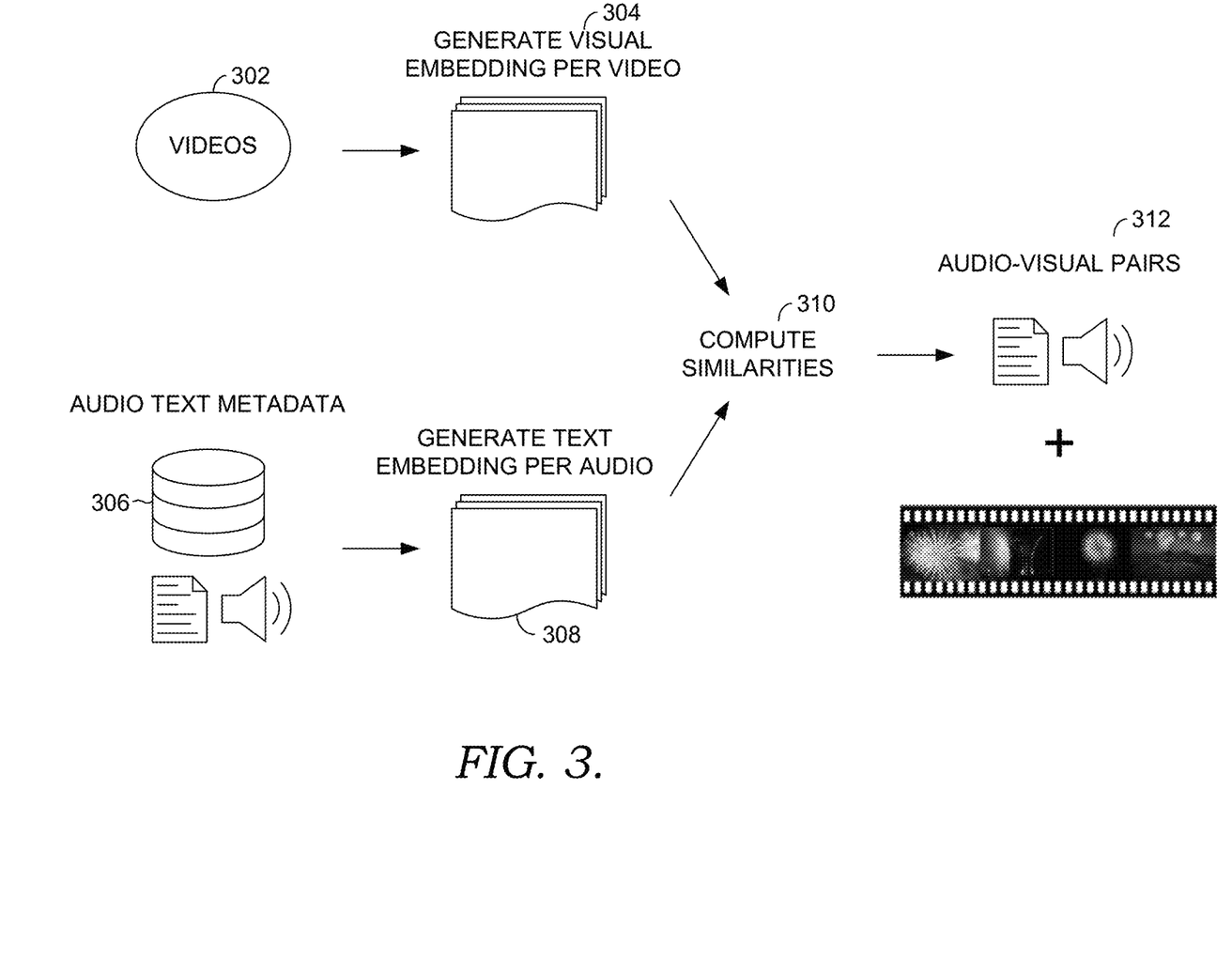
FIG. 3 is a block diagram illustrating an example of training an audio encoder for sound effects recommendation in accordance with some implementations of the present disclosure.

With reference to FIG. 3, a block diagram is provided illustrating an example of generating audio-visual pairs. As shown in FIG. 3, given a collection of videos 302, a collection of visual embeddings 304 is generated. For each video from the collection of videos 302, the video or one or more frames from the video (e.g., a center frame) is provided as input to a visual encoder (e.g., the visual encoder 110 of FIG. 1), which generates a visual embedding for the video. For instance, the visual encoder from the CLIP model could be used to create normalized image embeddings of frames from the videos 302. On the audio side, given audio text metadata 306 from a collection of audio files, a collection of text embeddings 308 is generated. For each audio file, text metadata describing the audio is provided as input to a text encoder (e.g., the text encoder 112 of FIG. 1), which generates a text embedding for the audio file. For instance, the text encoder from the CLIP model could be used to compute normalized text embeddings using the text metadata associated with each audio file, pre-pending "The sound of a [text metadata]" to the text metadata of each audio file.

Similarities 310 (e.g., cosine similarities) are computed between pairs of visual embeddings and text embeddings. Audio-visual pairs 312 are identified based on the similarities 310. An audio-visual pair could comprise an audio file and a video identified based on the similarity between the text embedding for the audio file and the visual embedding for the video. For instance, the text embedding for a given audio file could be used as a query to identify one or more videos by computing the cosine similarity between the text embedding query and visual embeddings 304 for the videos 302. In some aspects, the top-n most similar videos for the audio file (based on similarities between the visual embeddings for the videos and the text embedding for the audio file) are selected and mapped to the audio file to generate audio-visual pairs for the audio file. In some aspects, a threshold similarity is used to select to pair particular visuals and audio files based on the similarity score for a pair satisfying the threshold.

In some aspects, curation is performed on a set of videos prior to identifying audio-visual pairs to produce training data of high-quality videos paired with corresponding audio, with a focus on foregrounded, sound-producing "single" object scenes. In particular, video curation can be performed on a video dataset to identify videos with object-centered scenes (i.e., objects that typically generate sound and thus benefit from sound effects), while removing videos from the video dataset that are human-centered, ambient scenes, or animations. The video curation could be performed by removing videos with tags that indicate the video is human-centered or contains ambient scenes. For example, videos containing tags such as "male speech", "crowd", "landscape", and "illustration" could be removed.

In some instances, the video dataset is further curated so it better matches the sounds in a sound effect audio dataset. For instance, a sound effect audio dataset could contain audio files spanning a number of high-level categories (e.g., "Vehicles", "Glass", "Computers") and sub-categories (e.g., high-level category "Guns" and sub-category "Antique"). The sound effect audio dataset can also contain metadata tags associated with each audio file. In addition to this set of categories, the video curation could use the sound categories from an ontology, such as the AudioSet ontology (excluding human sounds and instrument sounds), a dataset commonly used for audio AI research. For instance, the union of the sound effects categories/sub-categories and the AudioSet categories, could be used to further filter the video dataset by removing videos whose metadata does not contain at least one of these target sound categories. This provides videos that are highly likely to contain visual scenes that are a good match for sound effects in a sound effects audio dataset.

Returning to FIG. 1, the audio encoder training component 120 employs the audio-visual pairs from the audio-visual pairing component 118 to train the audio encoder 114. For each audio-visual pair, the visual (i.e., image, video, frame(s) from video) is provided as input to the visual encoder 110 to generate a visual embedding, and the audio is provided as input to the audio encoder 114 to generate an audio embedding. A contrastive loss is determined based on the visual embedding and the audio embedding, and the audio encoder 114 is updated based on the contrastive loss.

For instance, parameters (e.g., weights) of the audio encoder 114 could be updated using backpropagation. In some configuration, the parameters of the visual encoder 110 are frozen (i.e., not changed/updated) while training the audio encoder 114. However, in some configurations, the visual encoder 110 and/or the text encoder 112 can also be updated while training the audio encoder 114.

This process of updating the audio encoder 114 is iterated for a number of audio-visual pairs. As part of this training, the audio encoder 114 learns to generate audio embeddings that are similar to visual embeddings for the audio-visual pairs. For instance, an audio embedding for an audio from an audio-visual pair will be similar to a visual embedding for a visual from that audio-visual pair (i.e., the audio embedding is close to the visual embedding in the multi-modal embedding space).

Figure 4:
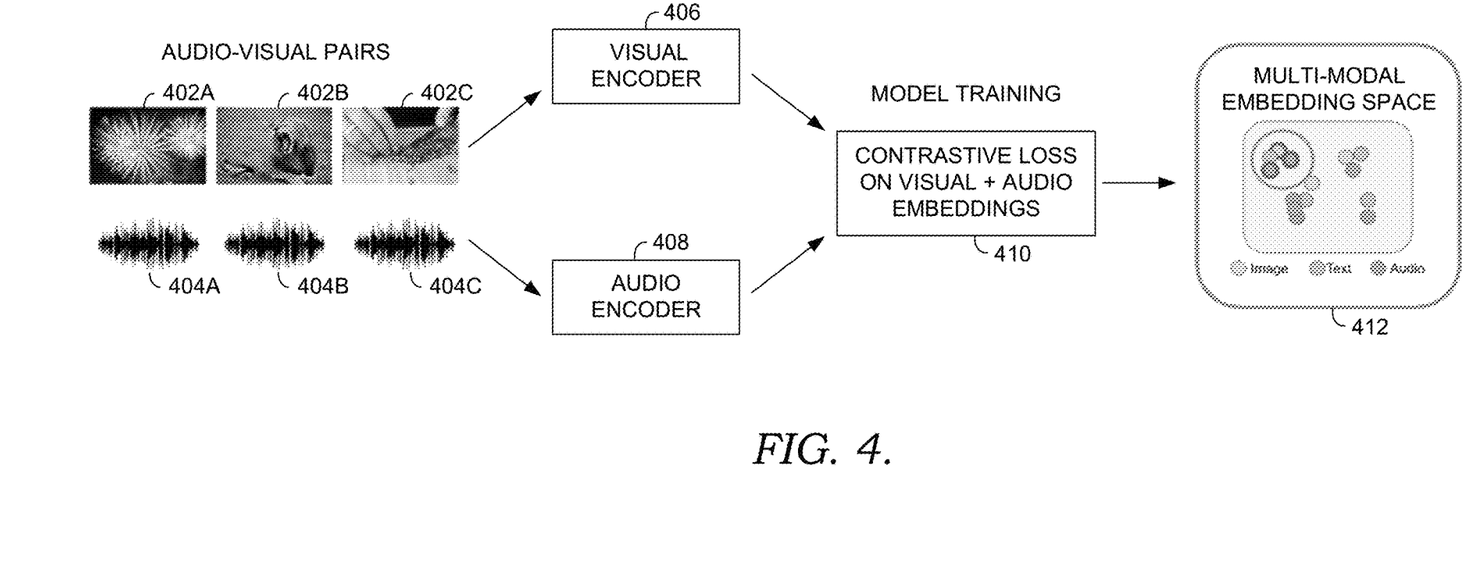
FIG. 4 is a block diagram illustrating an example of selecting audio-visual pairs for training an audio encoder in accordance with some implementations of the present disclosure.

FIG. 4 provides a block diagram showing an example of training an audio encoder. As shown in FIG. 4, a number of audio-visual pairs are provided, including visual 402A paired with audio 404A, visual 402B paired with audio 404B, and visual 402C paired with audio 404C. At each iteration, the visual from an audio-visual pair (e.g., visual 402A) is provided as input to a visual encoder 406 (which can correspond to the visual encoder 110 of FIG. 1) to generate a visual embedding. Additionally, the audio from that audio-visual pair (e.g., audio 402A) is provided as input to an audio encoder 408 (which can correspond to audio encoder 114 of FIG. 1) to generate an audio embedding. Model training 410 of the audio encoder 408 is performed based on the visual embedding and the audio embedding. In particular, a contrastive loss is determined based on the visual embedding and the audio embedding, and parameters (e.g., weights) of the audio encoder 408 are updated (e.g., using backpropagation) based on the contrastive loss. As shown in FIG. 4, the result of training the audio encoder 408 is to produce a multi-modal embedding space 412 for images, text, and audio.

With reference again to FIG. 1, the sound effects system 104 further includes a user interface component 122 that provides one or more user interfaces for interacting with the sound effects system 104. The user interface component 122 provides user interfaces to a user device, such as the user device 102 (which includes the application 108 for interacting with the sound effects system 104). For instance, the user interface component 122 can provide user interfaces for, among other things, interacting with the sound effects system 104 to train one or more of the encoder 110, 112, 114. The user interface component 112 can also provide user interfaces for, among other things, interacting with the sound effects system 104 to receive inputs (e.g., videos, images, and/or text) and to output sound effects recommendations for the inputs. For instance, a user interface could be provided to the user device 102 that allows the user to submit a video as input. Based on the video input, one or more sound effects are identified and a user interface provided that presents the one or more sound effects as recommendations for the video.

Example Methods for Sound Effects Recommendation

Figure 5:
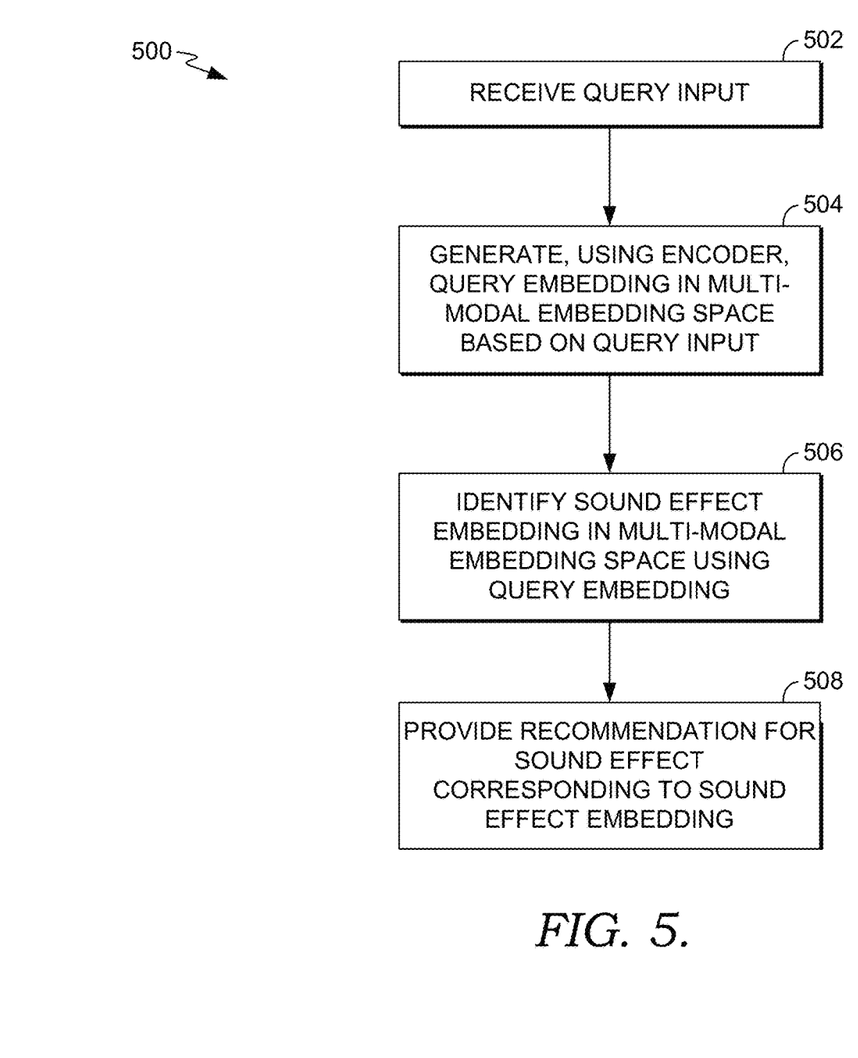
FIG. 5 is a flow diagram showing a method for providing a sound effect recommendation in accordance with some implementations of the present disclosure.

With reference now to FIG. 5, a flow diagram is provided that illustrates a method 500 for providing sound effects recommendations. The method 500 can be performed, for instance, by the sound effects recommendation component 116 of FIG. 1. Each block of the method 500 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 502, a query input is received. The query input comprises a video, an image, text, or any combination thereof. The query input is provided to an encoder to generated a query embedding in a multi-modal embedding space, as shown at block 504. In some aspects, the multi-modal embedding space comprises a visual-text-audio embedding space. For instance, the multi-modal embedding space is provided in some configurations by training an audio encoder to project audio into a visual-text embedding space to provide the visual-text-audio embedding space.

In some instances, the query input is an image, and the image is provided to an image encoder to generate an image embedding in the multi-modal embedding space. In some instances, the query input is a video, and one or more frames of the video are extracted and provided as input to an image encoder to generate an image embedding in the multi-modal embedding space. In some instances, the query input is a video, which is provided as input to a video encoder to generate a video embedding in the multi-modal space. In some instances, the query input is text, which is provided as input to a text encoder to generate a text embedding in the multi-modal space. When the query input comprises multiple modalities, an embedding can be generated for each modality. For instance, if the query input comprises an image and text, an image embedding and a text embedding is generated.

A sound effect embedding is identified using the query embedding, as shown at block 506. In particular, an audio encoder is used to project sound effects to sound effect embeddings in the multi-modal embedding space. Given the query embedding and a sound effect embedding for a given sound effect, a similarity score (e.g., cosine similarity) is determined and used to identify the sound effect embedding. For instance, in some cases, the sound effect embedding could be identified for the query embedding based on the similarity score satisfying a threshold. In some cases, the sound effect embedding could be identified for the query embedding based on the similarity score indicating that the similarity for the sound effect embedding is greater than the similarity for other sound effect embeddings (e.g., the top-n sound effect embeddings with the highest similarity scores). In some instances, multiple query embeddings are generated at block 504 (e.g., an image embedding and a text embedding), and the multiple query embeddings are used to identify the sound effect embedding at block 506. In some configurations, a single embedding could be generated from the multiple query embeddings (e.g., an average embedding) and used to determine a similarity score for a sound effect embedding. In other configurations, a similarity score for a sound effect embedding is determined for each query embedding.

A recommendation for a sound effect corresponding to the identified sound effect embedding is provided at block 508. In some instances, multiple sound effect embeddings are identified at block 506 (e.g., the top-n sound effect embeddings based on similarity scores), and the recommendation identifies the sound effect corresponding to each of those sound effect embeddings.

Figure 6:
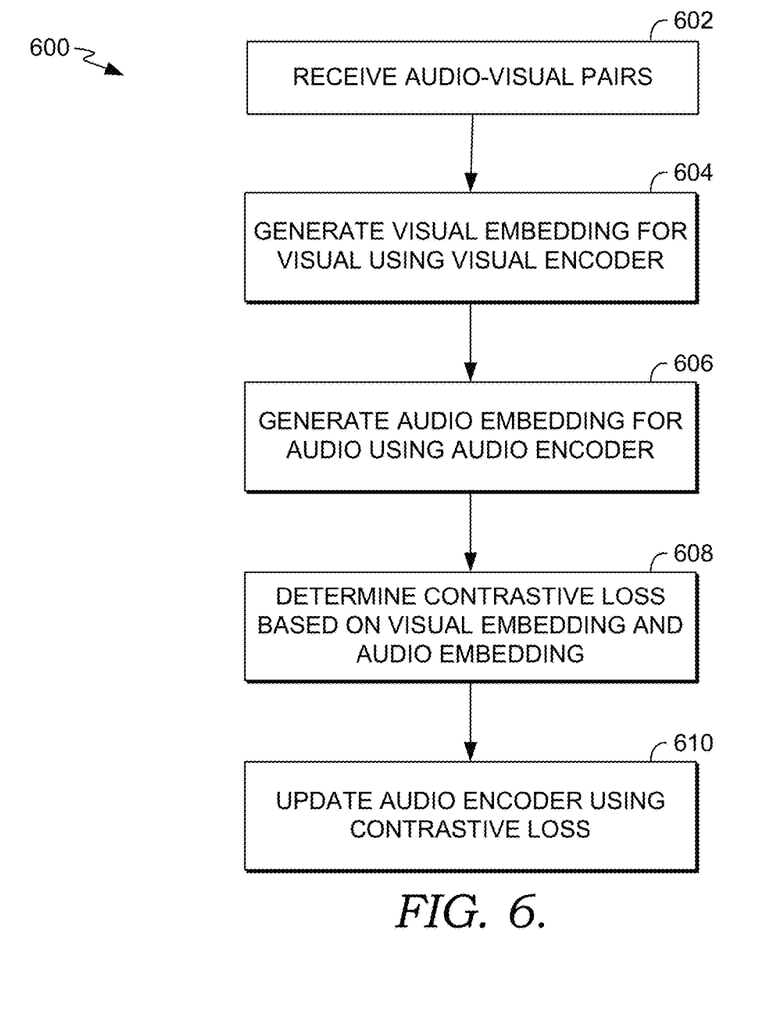
FIG. 6 is a flow diagram showing a method for training an audio encoder for sound effects recommendation in accordance with some implementations of the present disclosure.

Turning next to FIG. 6, a flow diagram is provided showing a method 600 for training an audio encoder. The method 600 can be performed, for instance, by the audio encoder training component 120 of FIG. 1. As shown at block 602, audio-visual pairs are received as a training dataset for training the audio encoder. The audio-visual pairs could be obtained from an existing dataset, or the audio-visual pairs could be generated by analyzing a set of audio files and a set of visuals (e.g., using the method 700 described below with reference to FIG. 7).

Given the visual (e.g., image, video, frame(s) of video) from a given audio-visual pair, a visual embedding in a multi-modal embedding space is generated by a visual encoder, as shown at block 604. Additionally, given the audio from that audio-visual pair, an audio embedding in the multi-modal embedding space is generated by the audio encoder, as shown at block 606. In some aspects, the multi-modal embedding space initially comprises a visual-text embedding space, such as the CLIP embedding space, and the audio encoder projects the audio into the visual-text embedding space.

A contrastive loss is determined based on the visual embedding and the audio embedding, as shown at block 608. Based on the contrastive loss, the audio encoder is updated, as shown at block 610. For instance, parameters (e.g., weights) of the audio encoder could be updated (e.g., via backpropagation) based on the contrastive loss. The process of blocks 604 through 610 could be repeated for each audio-visual pair from the training dataset.

Figure 7:
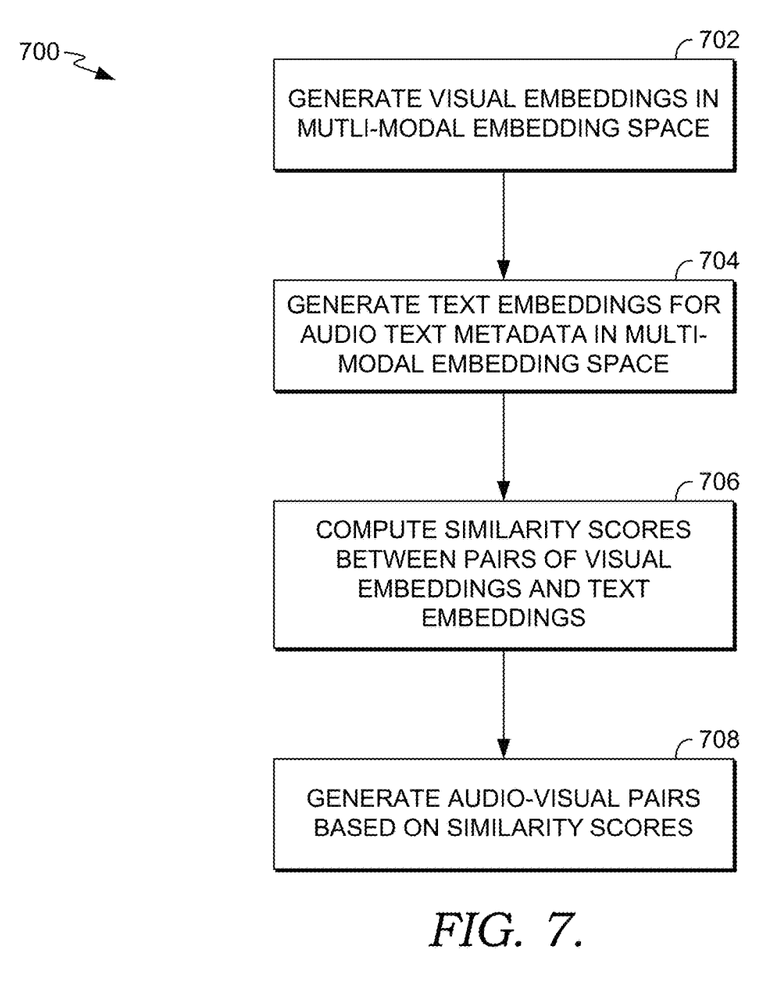
FIG. 7 is a flow diagram showing a method for generating audio-visual pairs for training an audio encoder in accordance with some implementations of the present disclosure.

FIG. 7 provides a flow diagram showing a method 700 for generating audio-visual pairs. The method 700 can be performed, for instance, by the audio-visual pairing component 118 of FIG. 1. As shown at block 702, visual embeddings in a multi-modal embedding space (e.g., an image-text embedding space or a video-text embedding space) are generated for a set of visuals (e.g., a collection of images and/or videos). In particular, a visual encoder is used to generate a visual embedding for each visual from the set of visuals. As shown at block 704, text embeddings in the multi-modal embedding space are generated for a set of audio files (e.g., a collection of sound effects). In particular, a text encoder is used to generate a text embedding from text metadata associated with each audio file from the set of audio files.

Similarity scores are computed between pairs of visual embeddings and text embeddings, as show at block 706. Audio-visual pairs are generated based on the similarity scores, as shown at block 708, by pairing visuals and audio files corresponding to the visual embeddings and the text embeddings, respectively. In some instances, an audio-visual pair is generated when a similarity score satisfies a threshold. In some instances, an audio-visual pair is generated based on the top-n similarity scores for a given audio file or visual.

Exemplary Operating Environment

Figure 8:
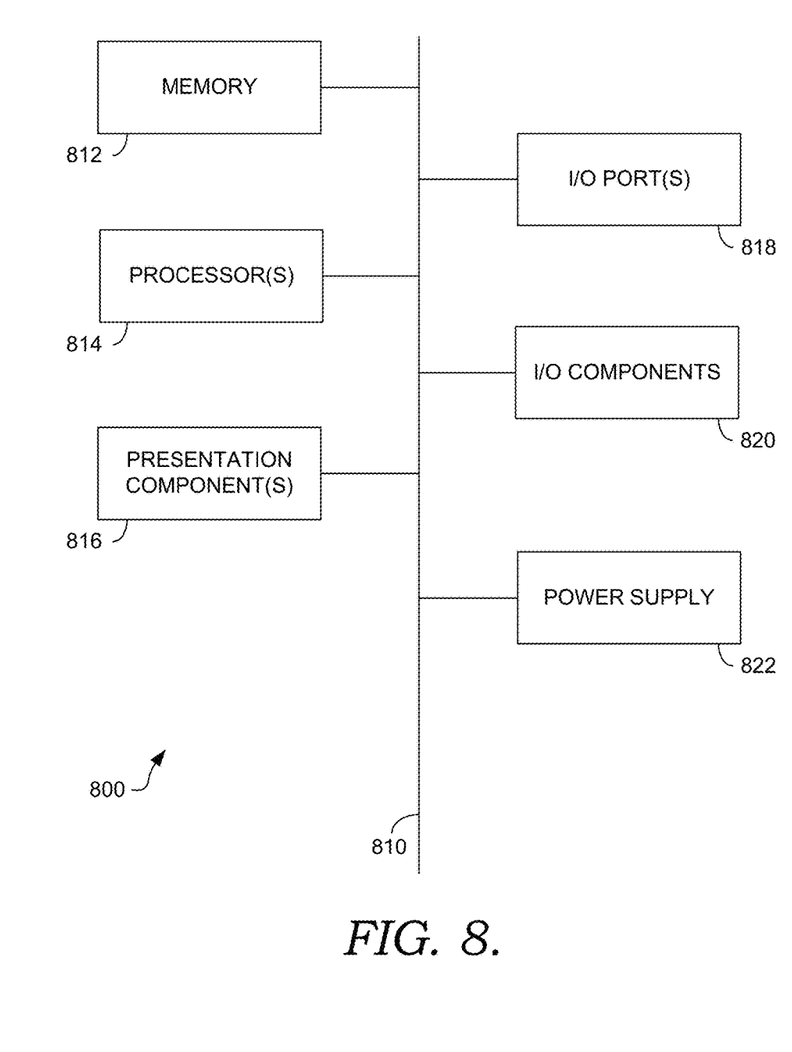
FIG. 8 is a block diagram of an exemplary computing environment suitable for use in implementations of the present disclosure.

Having described implementations of the present disclosure, an exemplary operating environment in which embodiments of the present technology can be implemented is described below in order to provide a general context for various aspects of the present disclosure. Referring initially to FIG. 8 in particular, an exemplary operating environment for implementing embodiments of the present technology is shown and designated generally as computing device 800. Computing device 800 is but one example of a suitable computing environment and is not intended to suggest any limitation as to the scope of use or functionality of the technology. Neither should the computing device 800 be interpreted as having any dependency or requirement relating to any one or combination of components illustrated.

The technology can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology can be practiced in a variety of system configurations, including hand-held devices, consumer electronics, general-purpose computers, more specialty computing devices, etc. The technology can also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output (I/O) ports 818, input/output components 820, and illustrative power supply 822. Bus 810 represents what can be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. The inventors recognize that such is the nature of the art, and reiterate that the diagram of FIG. 8 is merely illustrative of an exemplary computing device that can be used in connection with one or more embodiments of the present technology. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory can be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which can be built in. Illustrative components include a microphone, joystick, game pad, satellite dish, scanner, printer, wireless device, etc. The I/O components 820 can provide a natural user interface (NUI) that processes air gestures, voice, or other physiological inputs generated by a user. In some instance, inputs can be transmitted to an appropriate network element for further processing. A NUI can implement any combination of speech recognition, touch and stylus recognition, facial recognition, biometric recognition, gesture recognition both on screen and adjacent to the screen, air gestures, head and eye-tracking, and touch recognition associated with displays on the computing device 800. The computing device 800 can be equipped with depth cameras, such as, stereoscopic camera systems, infrared camera systems, RGB camera systems, and combinations of these for gesture detection and recognition. Additionally, the computing device 800 can be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements can be employed to achieve the desired functionality within the scope of the present disclosure. For example, the components in the embodiments depicted in the figures are shown with lines for the sake of conceptual clarity. Other arrangements of these and other components can also be implemented. For example, although some components are depicted as single components, many of the elements described herein can be implemented as discrete or distributed components or in conjunction with other components, and in any suitable combination and location. Some elements can be omitted altogether. Moreover, various functions described herein as being performed by one or more entities can be carried out by hardware, firmware, and/or software, as described below. For instance, various functions can be carried out by a processor executing instructions stored in memory. As such, other arrangements and elements (e.g., machines, interfaces, functions, orders, and groupings of functions) can be used in addition to or instead of those shown.

Embodiments described herein can be combined with one or more of the specifically described alternatives. In particular, an embodiment that is claimed can contain a reference, in the alternative, to more than one other embodiment. The embodiment that is claimed can specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology can generally refer to the technical solution environment and the schematics described herein, it is understood that the techniques described can be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

What is claimed is:

1. A computer-implemented method comprising:
generating a plurality of audio-visual pairs using a visual encoder and a text encoder pre-trained to embed visuals and text into a visual-text embedding space of the visual encoder and the text encoder by:
generating, using the visual encoder, a corresponding visual embedding in the visual-text embedding space for each visual from a plurality of visuals,
generating, using the text encoder, a corresponding text embedding in the visual-text embedding space using text metadata for each audio file from a plurality of audio files,
computing similarity scores between pairs of visual embeddings and text embeddings, and based on the similarity scores, pairing visuals from the plurality of visuals with audio of the audio files from the plurality of audio files to provide the plurality of audio-visual pairs;

training, using the plurality of audio-visual pairs, an audio encoder to project audio into the visual-text embedding space of the visual encoder and the text encoder to provide a visual-text-audio embedding space for visuals, text, and audio; and processing a query input by:
receiving the query input,
generating, using an encoder, a query embedding in the visual-text-audio embedding space based on the query input, io;
identifying a sound effect embedding in the visual-text-audio embedding space using the query embedding, the sound effect embedding having been generated using the trained audio encoder, and
providing a recommendation for a sound effect corresponding to the sound effect embedding.

2. The computer-implemented method of claim 1, wherein the query input comprises a video.

3. The computer-implemented method of claim 2, wherein the encoder comprises an image encoder, and wherein generating the query embedding comprises:
extracting a frame from the video; and
providing the frame as input to the encoder to generate the query embedding in the visual-text-audio embedding space.

4. The computer-implemented method of claim 2, wherein the encoder comprises a video encoder, and wherein generating the query embedding comprises:
providing the video as input to the encoder to generate the query embedding in the visual-text-audio embedding space.

5. The computer-implemented method of claim 1, wherein the query input comprises a text, and wherein the encoder comprises a text encoder.

6. The computer-implemented method of claim 1, wherein the query input comprises a video and a text, wherein the encoder comprises the visual encoder and the text encoder, and wherein generating the query embedding comprises:
generating, using the visual encoder, a first query embedding in the visual-text-audio embedding space using the video; and
generating, using the text encoder, a second query embedding in the visual-text-audio embedding space using the text.

7. The computer-implemented method of claim 6, wherein identifying the sound effect embedding in the visual-text-audio embedding space using the query embedding comprises identifying the sound effect embedding in the visual-text-audio embedding space using the first query embedding and the second query embedding.

8. The computer-implemented method of claim 1, wherein identifying a sound effect embedding in the visual-text-audio embedding space using the query embedding comprises:
computing a similarity score using the sound effect embedding and the query embedding; and
selecting the sound effect embedding based on the similarity score.

9. One or more computer storage media storing computer-useable instructions that, when used by a computing device, cause the computing device to perform operations, the operations comprising:

generating a plurality of audio-visual pairs using a visual encoder and a text encoder pre-trained to embed visuals and text into a visual-text embedding space of the visual encoder and the text encoder by:
generating, using the visual encoder, a corresponding visual embedding in the visual-text embedding space for each visual from a plurality of visuals,
generating, using the text encoder, a corresponding text embedding in the visual-text embedding space using text metadata for each audio file from a plurality of audio files,
computing similarity scores between pairs of visual embeddings and text embeddings, and
based on the similarity scores, pairing visuals from the plurality of visuals with audio of the audio files from the plurality of audio files to provide the plurality of audio-visual pairs; and training, using the plurality of audio-visual pairs, an audio encoder to project audio into the visual-text embedding space of the visual encoder and the text encoder to provide a visual-text-audio embedding space for visuals, text, and audio, and wherein the audio encoder is trained using a first audio-visual pair from the plurality of audio-visual pairs by:
generating, using the visual encoder, a visual embedding in the visual-text embedding space using a first visual from the first audio-visual pair,
generating, using the audio encoder, an audio embedding in the visual-text embedding space using a first audio from the first audio-visual pair,
determining a contrastive loss based on the visual embedding and the audio embedding, and
updating parameters of the audio encoder using the contrastive loss.

10. The one or more computer storage media of claim 9, wherein the visual-text embedding space comprises a joint image and text embedding space.

11. The one or more computer storage media of claim 10, wherein the first visual comprises a video and the visual encoder comprises an image encoder, and wherein generating the visual embedding comprises:
extracting a frame from the video; and
providing the frame as input to the image encoder to generate the visual embedding in the visual-text embedding space.

12. The one or more computer storage media of claim 9, wherein the visual-text embedding space comprises a joint video and text embedding space.

13. The one or more computer storage media of claim 12, wherein the first visual comprises a video and the visual encoder comprises a video encoder, and wherein generating the visual embedding comprises:
providing the video as input to the video encoder to generate the visual embedding in the visual-text embedding space.

14. The one or more computer storage media of claim 9, wherein training the audio encoder using the contrastive loss comprises updating parameters of the audio encoder while freezing parameters of the visual encoder.

15. A computer system comprising:
a processor; and
a computer storage medium storing computer-useable instructions that, when used by the processor, causes the computer system to perform operations comprising:
generating a plurality of audio-visual pairs using a visual encoder and a text encoder pre-trained to embed visuals and text into a visual-text embedding space of the visual encoder and the text encoder by:
generating, using the visual encoder, a corresponding visual embedding in a visual-text embedding space for each visual from the plurality of visuals,
generating, using the text encoder, a corresponding text embedding in the visual-text embedding space using text metadata for each audio file from a plurality of audio files,
computing similarity scores for pairs of visual embeddings and text embeddings,
based on the similarity scores, pairing visuals from the plurality of visuals with audio of the audio files from the plurality of audio files to provide the plurality of audio-visual pairs; and
training, using the plurality of audio-visual pairs, an audio encoder to project audio into the visual-text embedding space of the visual encoder and the text encoder to provide a visual-text-audio embedding space for visuals, text, and audio.

16. The computer system of claim 15, wherein the plurality of visuals comprises a plurality of videos and the visual encoder comprises a video encoder, and wherein generating the corresponding visual embedding for each visual comprises:
providing each video as input to the visual encoder to generate the corresponding visual embedding for each video.

17. The computer system of claim 15, wherein the plurality of visuals comprises a plurality of videos and the visual encoder comprises an image encoder, and wherein generating the corresponding visual embedding for each visual comprises:
providing one or more frames from each video as input to the visual encoder to generate the corresponding visual embedding for each video.

18. The computer system of claim 15, wherein the plurality of audio files comprises a plurality of sound effects.

19. The computer system of claim 15, wherein training the audio encoder using the plurality of audio-visual pairs comprises:
generating, using the visual encoder, a first visual embedding in the visual-text embedding space for a first visual from a first audio-visual pair from the plurality of audio-visual pairs;
generating, using the audio encoder, a first audio embedding in the visual-text embedding space for a first audio from the first audio-visual pair;
determining a contrastive loss based on the first visual embedding and the first audio embedding; and
updating one or more parameters of the audio encoder based on the contrastive loss.

* * * * *